United States Patent
Kitts (10) Patent No.: US 7,197,474 B1
(45) Date of Patent: Mar. 27, 2007

(54) METHOD OF MODELING PRODUCT DEMAND SUBJECT TO A LARGE NUMBER OF INTERACTIONS

(75) Inventor: Brendan J. Kitts, Cambridge, MA (US)

(73) Assignee: Vignette Corporation, Austin, TX (US)

( * ) Notice: Subject to any disclaimer, the term of this patent is extended or adjusted under 35 U.S.C. 154(b) by 0 days.

(21) Appl. No.: 11/373,747

(22) Filed: Mar. 10, 2006

Related U.S. Application Data (63) Continuation of application No. 09/682,039, filed on Jul. 12, 2001.

(51) Int. Cl.
G06F 17/30 (2006.01)

(52) U.S. Cl. ........................................... 705/10
(58) Field of Classification Search ................... 705/10
See application file for complete search history.

(56) References Cited

U.S. PATENT DOCUMENTS

| | | |
|---|---|---|
| 4,754,428 A | 6/1988 | Schultz et al. |
| 4,811,207 A | 3/1989 | Hikita et al. |
| 5,210,824 A | 5/1993 | Putz et al. |
| 5,212,787 A | 5/1993 | Baker et al. |
| 5,226,161 A | 7/1993 | Khoyi et al. |
| 5,257,369 A | 10/1993 | Skeen et al. |
| 5,331,673 A | 7/1994 | Elko et al. |
| 5,339,392 A | 8/1994 | Risberg et al. |
| 5,421,015 A | 5/1995 | Khoyi et al. |
| 5,572,643 A | 11/1996 | Judson |
| 5,704,017 A | 12/1997 | Heckerman et al. |
| 5,727,129 A | 3/1998 | Barrett et al. |
| 5,732,218 A | 3/1998 | Bland et al. |
| 5,740,430 A | 4/1998 | Rosenberg et al. |
| 5,761,416 A | 6/1998 | Mandal et al. |
| 5,774,660 A | 6/1998 | Brendel et al. |

(Continued)

FOREIGN PATENT DOCUMENTS

JP 07200698 * 8/1995

(Continued)

OTHER PUBLICATIONS

Mendenhall, William; Sincich, Terry; A Second Course in Statistics, Prentice Hall, 1996.*

(Continued)

*Primary Examiner*—Romain Jeanty
*Assistant Examiner*—Kalyan K. Deshpande
(74) *Attorney, Agent, or Firm*—Sprinkle IP Law Group (57) ABSTRACT

A data processing system-implemented method or data processing system readable medium can be used to model operating parameter(s) for a vendor. Detailed analysis of the impact of prices or other variables, on the demand of each item, is performed. These allow us to prune large numbers of prices or other variables which have little or no impact on a given item. After determining which prices and other variables are significantly related to an item, a more in-depth examination of that small list of variables may be performed. This in-depth examination will result in a set of final weighing factors, quantifying the effect of each on the item. The weighing factors for all other variables can be assigned a value of zero. By limiting the number of non-zero weighing factors, the time needed to generate all the weighing factors for a matrix (or matrices) is reduced.

49 Claims, 2 Drawing Sheets

U.S. PATENT DOCUMENTS

| | | | |
|---|---|---|---|
| 5,790,426 | A | 8/1998 | Robinson |
| 5,790,790 | A | 8/1998 | Smith et al. |
| 5,794,215 | A | 8/1998 | Goodwin, III |
| 5,796,952 | A | 8/1998 | Davis et al. |
| 5,870,559 | A | 2/1999 | Leshem et al. |
| 5,878,223 | A | 3/1999 | Becker et al. |
| 5,884,282 | A | 3/1999 | Robinson |
| 5,918,014 | A | 6/1999 | Robinson |
| 5,958,008 | A | 9/1999 | Pogrebisky et al. |
| 5,991,735 | A | 11/1999 | Gerace |
| 6,012,052 | A | 1/2000 | Altschuler et al. |
| 6,041,311 | A | 3/2000 | Chislenko et al. |
| 6,049,777 | A | 4/2000 | Sheena et al. |
| 6,067,565 | A | 5/2000 | Horvitz |
| 6,085,226 | A | 7/2000 | Horvitz |
| 6,092,049 | A | 7/2000 | Chislenko et al. |
| 6,094,662 | A | 7/2000 | Hawes |
| 6,112,279 | A | 8/2000 | Wang |
| 6,128,665 | A | 10/2000 | Fields et al. |
| 6,138,141 | A | 10/2000 | DeSimone et al. |
| 6,141,737 | A | 10/2000 | Krantz et al. |
| 6,185,586 | B1 | 2/2001 | Judson |
| 6,185,608 | B1 | 2/2001 | Hon et al. |
| 6,246,972 | B1* | 6/2001 | Klimasauskas ............... 703/2 |
| 6,308,162 | B1 | 10/2001 | Ouimet et al. |
| 6,405,173 | B1 | 6/2002 | Honarvar et al. |
| 6,553,352 | B2* | 4/2003 | Delurgio et al. ............ 705/400 |
| 6,708,155 | B1* | 3/2004 | Honarvar et al. ............. 705/7 |
| 6,988,076 | B2* | 1/2006 | Ouimet ......................... 705/7 |
| 7,006,981 | B2* | 2/2006 | Rose et al. ................... 705/10 |
| 2001/0014868 | A1* | 8/2001 | Herz et al. .................... 705/14 |
| 2002/0082886 | A1* | 6/2002 | Manganaris et al. ........... 705/7 |
| 2002/0152237 | A1 | 10/2002 | Cohen et al. |
| 2003/0030637 | A1* | 2/2003 | Grinstein et al. ........... 345/420 |

FOREIGN PATENT DOCUMENTS

| | | |
|---|---|---|
| JP | 07200698 A | 8/1995 |

OTHER PUBLICATIONS

Bansal Kanti; Vadhavkar, Sanjeev; Gupta, Amar; "Neural Networks Based on Forecasting Techniques for Inventory Control Applications", Data Mining and Knowledge Discovery, 1998.*

Kleinberg, Jon; Papdimitriou, Christos; Raghavan, Prabhakar; "A Microeconomic View of Data Mining", Data Mining and Knowledge Discovery, 1998.*

Fu, Xiaobin; Budzik, Jay; Hammond, Kristian J.; "Mining Navigation History for Recommendation", Proceedings of the 5th International Conference of Intelligent User Interfaces, 2000.*

Silverstein, Craig; Brin, Sergey; Motwani, Rajeev; "Beyond Market Baskets: Generalizing Association Rules to Dependence Rules", Data Mining and Knowledge Discovery, 1998.*

Han, Eui-Hong (Sam); Karypis, George; Kumar, Vipin; Mobasher, Bamshad; "Clustering in a High-Dimensional Space Using Hypergraph Models", Bulletin of the Technical Committee on Data Engineering, 1998.*

Eisen, Michael B.; Spellman, Paul T.; Brown, Patrick O.; Botstein, David; "Cluster Analysis and Display of Genome-Wide Expression Patters", Proc. Natl. Acad. Sci., 1998.*

Discount Store News, "Datasage customer analyst", product information and fact sheet; DataSage, Inc., Reading, MA, 11 pages, Apr. 1998.

Montgomery, et al., "Estimating Price Elasticities with Theory-Based Priors," *J. Marketing Research*, vol. 36, pp. 413-423, pp. 13-41, Nov. 1999.

Simon, H., "Price Management", Chapter 2, Elsevier Science Publishers B.V., Amsterdam, the Netherlands, 32 pages, 1989.

Subrahmanyan, et al., "Developing Optimal Pricing and Inventory Policies for Retailers Who Face Uncertain Demand", J. Retailing, vol. 72, pp. 7-30, 1996.

Vilcassim, et al., Investing Retailer Product Category Pricing From Household Scanner Panel Data, J. Retailing, vol. 71, pp. 103-128, Jan. 1995.

Kitts, "An Evaluation of Customer Retention and Revenue Forecasting in the Retail Sector; Investigation in the Effects of Seasonability, spending and Method" by DataSage, Inc., 63 pages, Oct. 25, 1996.

Kitts, "RMS Revenue and Retention Forecasting Final Phase Model Specification" by DataSage, Inc., 16 pages, Jan. 31, 2000.

Miller, "Applications Integration-Getting It Together", PC Magazine, pp. 111-112, 116-120, 136 and 138, Feb. 8, 1994.

PointCast 2.0 Eases Burden on Network, PC Week, 3 pages, Jun. 2, 1997.

Strom, "The Best of Push", 6 pages, Apr. 1997.

"When Shove Comes to Push", PC Week, 5 pages, Feb. 10, 1997.

Thirdvoice.com—Home Page and Frequently Asked Questions (7 pages), www.thirdvoice.com and www.thirdvoice.com/help.20/faq.htm, Jan. 2000.

Weinstein, "Tackling Technology", Progressive Grocer, V.78 No. 1., 6 pages, Jan. 1999.

Wellman, "Down in the (data) mines" Supermarket Business, pp. 33-35, Jan. 1999.

RT News, "New Customer Management System Returns Lost Sales to Dick's", RT Magazine, Bill Communications, Inc., 1 page, Jun. 1999.

"DatasSage Customer Analyst", product information, DataSage, Inc., Reading, MA, 2 pages, Jan. 1999.

Thierauf, "Decision Making Through Operations Research," 2nd. Ed., Wiley Series in Management and Administration, Ch. 1, pp. 3-31, pp. 343-382, App. A, pp. 609-920 (43 pages), 1975.

Riddington, "Modeling Choice and Switching Behavior Between Scottish Ski Centres," Applied Economics, vol. 32, pp. 1011-1018, Sep. 1998.

Bazan, "Conditioning of Rectangular Vandermonde Matrices with Noes in the Unit Disk," SIAM Journal of Matrix Analysis and Applications, vol. 21, No. .2, pp. 679-693, Jan. 25, 2000.

Okasha, Winning the Market Share Race, Pharmaceutical Executive, vol. 18, No. 10, 5 pages, Oct. 1998.

Shan, "A Theoretical Derivation of Relationships Between Forecast Errors," Hewlett-Packard Journal, vol. 49, No. 2, 8 pages, May 1998.

Caplin and Leahy, "Aggregation and Optimization with State-Dependant Pricing", Econometrica, pp. 67-92, May 1997.

Kinieczny, "Variable Price Adjustment Costs", Economic Inquiry, pp. 488-499, Jul. 1993.

* cited by examiner

METHOD OF MODELING PRODUCT DEMAND SUBJECT TO A LARGE NUMBER OF INTERACTIONS

CROSS-REFERENCE TO RELATED APPLICATIONS

This is a continuation application of U.S. patent application Ser. No. 09/682,039, filed Jul. 12, 2001, and entitled "METHOD OF MODELING PRODUCT DEMAND SUBJECT TO A LARGE NUMBER OF INTERACTIONS", which is incorporated herein by reference for all purposes.

BACKGROUND OF INVENTION

1. Field of the invention

This invention relates in general to methods and data processing system readable media, and more particularly, to methods of modeling operating parameters and data processing system readable media having software code for carrying out those methods.

2. Description of the Related Art

Selecting prices for thousands of items is a difficult proposition. The current practice indicates that retailers may be over-discounting products, with as many as 25%–30% of items being sold at some price discount. With profit margins so low already (approximately 1.5% is some business sectors), many retail stores may not be able to sustain aggressive price discounting.

Pricing is made difficult by the fact that products interact with each other. Decreasing the price of one juice item to increase traffic may merely result in the cannibalization of a more profitable juice brand (as consumers switch from one brand to the other), without increasing demand for all juice products. Similarly, raising prices may have pronounced consequences across category boundaries, such as decreasing the number of items bought in distant or unrelated categories due to a general reduction in store traffic.

Retailers have long been aware of price-demand interactions and have developed various strategies for coping with these effects. One common strategy is known as "loss leader pricing." "Loss leaders" are products that are kept at discounted prices because they are known to be high profile, common, and easily comparable between retailers. Typical loss leaders for grocers include milk, bread, eggs, and juice. Loss leaders are presently determined by retailer experience. A problem is correctly identifying which, if any, products are to be loss leaders.

Automated analysis of product interactions has as yet been limited to very small numbers of products, often within the same category. Working with all product interactions is often practically infeasible because of the number of potential interactions that need to be examined. Assuming 100,000 items are examined, there could be 10 billion interactions.

A need exists for a comprehensive approach to modeling retail operations which incorporates knowledge of product interactions, consumer demand, storewide effects and the like. Furthermore, since most retail stores have thousands of items and millions of transactions, a need exists to deal with product interactions in a comprehensive, automated, computationally fast and efficient manner.

SUMMARY OF INVENTION

A method can be implemented on a data processing system to model an operating parameter. The method may incorporate knowledge of purchasing interactions between items in the inventory. The method may also incorporate knowledge of externalities (external events) that may affect the sales of products. The method may use a matrix of weighing factors. All weighing factors may be zero except for items where quantities sold of a particular item are significantly affected by a price change with that item or another item. Use of the method can reduce the computational time and resources required to build the model and allows the method to operate on a large amount of data in a reasonable amount of time. Applications of the method can include but are not limited to demand forecasting, price optimization, what-if analyses, promotion planning, and inventory control.

In one set of embodiments, a method can be used to model an operating parameter for a vendor. The method can comprise determining an effect of a variable on quantities of items sold by a vendor to determine which of the items are significantly affected by the variable. The method can further comprise generating a matrix that includes weighing factors. For each item that is more significantly affected by the variable, assigning a non-zero value to its corresponding first weighing factor. For all other items that are less significantly affected by the variable, assigning values of zero to their corresponding first weighing factors. The method still further comprises calculating the operating parameter using the matrix.

In other embodiments, a data processing system readable medium can have code embodied within it. The code can include instructions executable by a data processing system. The instructions may be configured to cause the data processing system to perform the methods described herein.

The foregoing general description and the following detailed description are exemplary and explanatory only and not restrictive of the invention, as claimed.

BRIEF DESCRIPTION OF DRAWINGS

The present invention is illustrated by way of example and not limitation in the accompanying figures, in which like references indicate the same elements, and in which.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

A method can be used to model an operating parameter for a vendor. Fast and computationally efficient significance tests can be first performed between the observed prices of items over time, externalities (as independent variables), and a target item's demand over time (as the dependent variable). After determining which variables appear to have a significant impact on item demand, weighing factors for those significant variables are then determined using stepwise regression. The weighing factors for all other variables can be assigned a value of zero. In one set of embodiments, the number of weighing factors having a non-zero value within the matrix (or matrices) may be no more than approximately ten percent of all weighing factors within the matrix (or matrices), and often may be no more than approximately one percent. By limiting the number of non-zero weighing factors, the time needed to generate all the weighing factors for a matrix (or matrices) is reduced. Also, the operating parameter can be calculated more quickly because of the relatively lesser number of weighing factors having a non-zero value. A data processing system readable medium can have code including instructions for carrying out the method. The present invention is defined by the appended claims are better understood after reading the descriptions of embodiments below.

Figure 1:
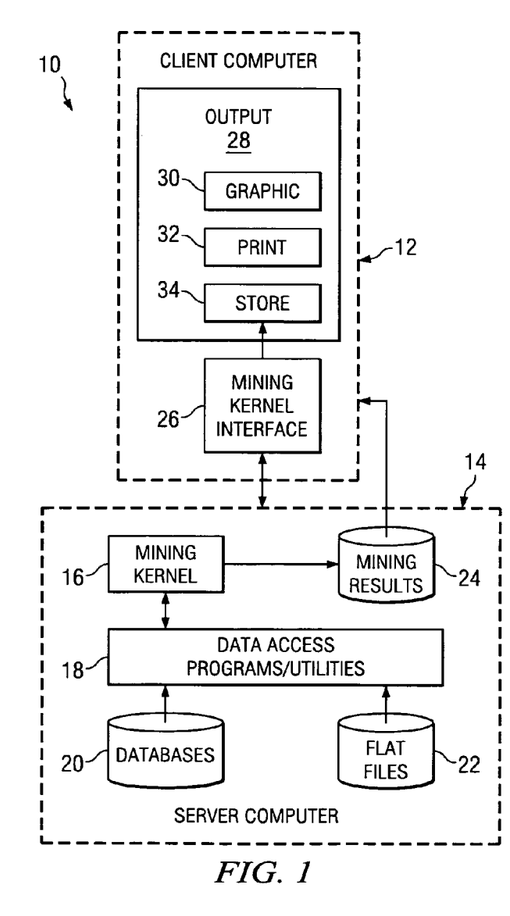
FIG. 1 includes an illustration of a functional block diagram of a system used with data mining.

FIG. 1 includes a system 10 for mining databases. In the particular architecture shown, the system 10 can include one or more data processing systems, such as a client computer 12 and a server computer 14. The server computer 14 may be a Unix computer, an OS/2 server, a Windows NT server, or the like. The server computer 14 may own a database system, such as DB2 or ORACLE, or it may have data on files on some data processing system readable storage medium, such as disk or tape.

As shown, the server computer 14 includes a mining kernel 16 that may be executed by a processor (not shown) within the server computer 14 as a series of computer-executable instructions. These instructions may reside, for example, in the random access memory (RAM) of the server computer 14. The RAM is an example of a data processing system readable medium that may have code embodied within it. The code can include instructions executable by a data processing system (e.g., client computer 12 or server computer 14), wherein the instructions are configured to cause the data processing system to perform a method. A focus of the methods may be to predict operating parameters for a vendor's store. The method is described in more detail later in this specification.

FIG. 1 shows that, through appropriate data access programs and utilities 18, the mining kernel 16 can access one or more databases 20 or flat files (e.g., text files) 22 that contain data chronicling transactions. After executing the instructions for methods, which are more fully described below, the mining kernel 16 can output relevant data it discovers to a mining results repository 24, which can be accessed by the client computer 12.

Additionally, FIG. 1 shows that the client computer 12 can include a mining kernel interface 26 which, like the mining kernel 16, may be implemented in suitable software code. Among other things, the interface 26 may function as an input mechanism for establishing certain variables, including the number of significant terms to use, window-size for timeseries smoothing, and so on. Further, the client computer 12 may include an output module 28 for outputting/displaying the mining results on a graphic display 30, a print mechanism 32, or a data processing system readable storage medium 34.

Figure 2:
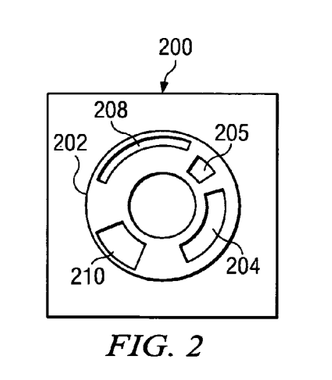
FIG. 2 includes an illustration of a data processing system storage medium including software code having instructions in accordance with an embodiment of the present invention.

In addition to RAM, the instructions in an embodiment of the present invention may be contained on a data storage device with a different data processing system readable storage medium, such as a floppy diskette. FIG. 2 illustrates a combination of software code elements 204, 206, 208 and 210 that are embodied within a data processing system readable medium 202 on a floppy diskette 200. Alternatively, the instructions may be stored as software code elements on a DASD array, magnetic tape, conventional hard disk drive, electronic read-only memory, optical storage device, CD ROM or other appropriate data processing system readable medium or storage device.

Figure 3:
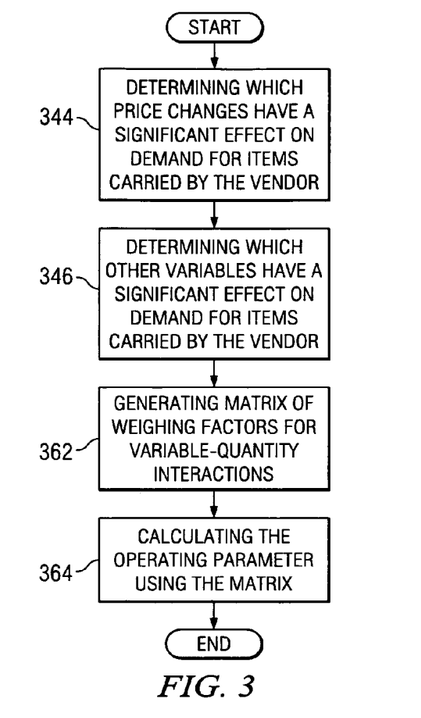
FIG. 3 includes a process flow diagram for determining an operating parameter for a vendor.

In an illustrative embodiment of the invention, the computer-executable instructions may be lines of compiled C++, Java, or other language code. Other architectures may be used. For example, the functions of the client computer 12 may be incorporated into the server computer 14, and vice versa. FIG. 3 includes an illustration, in the form of a flow chart, of the operation of such a software program.

Communications between the client computer 12 and the server computer 14 can be accomplished using electronic or optical signals. When a user (human) is at the client computer 12, the client computer 12 may convert the signals to a human understandable form when sending a communication to the user and may convert input from a human to appropriate electronic or optical signals to be used by the client computer 12 or the server computer 14.

FIG. 3 includes a flow diagram for a method of determining an operating parameter for a vendor. The method can comprise determining which price changes have a significant effect on demand for items carried by the vendor (block 344) and determining which other variables have a significant effect on demand for items by the vendor (block 346). The method can also comprise generating matrix of weighing factors for variable-quantity interactions (block 362). The method can further comprise calculating the operating parameter using the matrix (block 364). Details of the method are given in the subsequent paragraphs that follow.

1. Collect and Group the Data

The transaction data can be collected from Point of Sale (POS) records or another source (such as general ledgers), which might have details of customer or vendor orders (e.g., the method may use warehouse shipment data since this also shows quantities of items and the approximate dates of those sales). The different items can be denoted by a Universal Product Code (UPC), a Stock Keeping Unit (SKU), or any other convenient identifying code.

Transaction data is often stored in large databases, such as database 20, with records essentially unordered. If item timeseries are constructed from such data directly, all item timeseries may need to be maintained in memory. As each transaction is encountered, it would be added to the timeseries for whichever item to which that data referred. Such an approach is practically infeasible for large amounts of data and large numbers of items. Approximately 2.4 gigabytes of RAM memory space may be used for a million different items and a timeseries of 600 days. Many computers may need additional hardware to process this much data.

A technique can be used for efficiently building the timeseries data for price and quantity for each item may use relatively constant-sized memory and be performed in a time which is a linear function of the number of rows. The method involves changing the row order of the transaction data so that all records for each item are in contiguous rows (note the data does not need to be sorted). This will be referred to as a "grouping algorithm" (note that this is different from the SQL "group by" command). Grouping algorithms can run in linear time, meaning the time to perform the task is directly proportional to the amount of input data, and use disk resources for "scratch pad" storage.

Sorting algorithms such as "merge sort" can also be used to contiguously re-order rows, so that all item records are together. Merge-sorts can be performed using disk storage with a time complexity of $O(\phi*\log(\phi))$, where $\phi$ is the size of the input data.

Sorting algorithms may not be as fast as a grouping algorithm; however, both approaches (sorting or grouping) are good for handling very large amounts of data with the limited RAM available to current digital computers 12 or 14. As described in the next section, the re-ordering can be used to construct all timeseries in memory which does not grow with the number of items, or number of rows. Thus, the grouping or merge-sort algorithm can run using a constant amount of memory and be performed in a time that is $O(\phi)$ or $O(\phi*\log(\phi))$.

2. Build Quantity and Price Timeseries for Each Item.

After the data is re-ordered by item, timeseries for each item's price and quantity can be built. The timeseries can be built by scanning the item-ordered transaction data one row at a time. Information gleaned from the transaction data may include the item, unit price of the item and the number of units sold (quantity). When all transaction records for an item have been accessed, there can be no further instances of that item record in later rows of the transaction data since the contiguous reordering operation described above has been performed. The data processing system can "package up" the timeseries for that item and "flush" the timeseries information from RAM, which frees up RAM space.

During "packaging," the timeseries for the item is completed and can be sent to a database or file containing the timeseries data. After packaging, the data processing system can free the space within RAM occupied by the last item's timeseries data before processing timeseries information related to the next item. Thus, an advantage to the procedure is that item timeseries can be computed using an amount of memory which does not grow with the number of items.

There may be other considerations when building these timeseries. At a retail store, many prices may be recorded throughout a single day since customer prices are often affected by the use of store coupons, manufacturer coupons, and so on. Because of this, the price timeseries may be set to equal the mean or the median price of an item on a particular day, and the quantity timeseries can be the sum of units sold on that day.

Days on which no transaction for a particular item occurred also present difficulties for timeseries creation. On such days, there is no record of the price at which an item was ticketed. The price timeseries will erroneously have "zeros" on those days, even though the item was still on sale.

"Price filling" may help correct these price timeseries errors. Price filling involves finding the last day on which the item was sold, and then filling each subsequent day forward in time, when no transaction occurred, with that last observed price. Price filling may not be completely accurate because it may not reflect when a price change occurred when were no sales for the item occurred on that date, and it may not reflect days the store was closed (e.g., holidays).

Alternatively, a calendar with store prices and dates can be used to resolve what price items were on particular days during which no sales were recorded. Other methods may also be possible.

Moving sum windows may be used to help address the continuity of the quantity timeseries. Many products in a store will tend to be "slow moving" and may sell only a few units each week; with several days going by between sales. Such products are difficult for conventional techniques such as ARIMA to forecast, since they are a discontinuous function. To address this problem, it is possible to use moving sums to replace every day in the timeseries with the sum of that day and each of the X (e.g., 30) days that follow. This technique can improve predictive accuracy because the low-frequency patterns (seen more with items that only occasionally are sold) may be easier to predict than the high frequency patterns. The moving average exaggerates those lower frequency patterns. The 30-day windows are also intuitively appealing because forecasts can be interpreted as "W units per 30 days". Windows other than 30 days in width may also be used, for instance, slower-moving merchandise may require longer time windows.

3. Perform Fast Significance Tests for Price-Quantity Correlations.

After historical 30-day rolling-sum quantity and price timeseries for each item are obtained, predictive models can be built to predict the demand of each item given the prices of other items.

Using all of the cross-price variables would be difficult due to their sheer number. In a store with approximately 40,000 different items, for each item, there could be up to 39,999 items, plus its own price, that may be affecting its sales. Under normal circumstances, to derive an equation for one item, 40,000 regression equations would need to be tested in a stepwise procedure, with the stepwise procedure requiring perhaps 20–30 iterations before converging on a solution. Thus, performing stepwise regression on all items might require 32 billion regression computations.

Instead of that method, an efficient significance test may be performed to determine which terms (price change or other variables) are likely to have a significant effect on demand for items carried by the vendor (blocks 344 and 346 in FIG. 3).

In one embodiment, a correlation matrix Corr for each pair of items may be created. Each correlation factor ($Corr_{ij}$) represents an interaction between the demand series of a target item and the price series for each of the approximately 40,000 items. The (ij)th element of this matrix can be determined by the following equation.

$$Corr_{i,j} = \frac{\sum_{t=1}^{N}((price_{ti} - E[price_i]) \cdot (qty_{tj} - E[qty_j]))}{\sqrt{\sum_{t=1}^{N}((price_{ti} - E[price_i])^2 \cdot (qty_{tj} - E[qty_j])^2)}}$$

where, $price_{ti}$ is the price of item i at time t;

$E[price_i]$ is the expected price of item i;

$Qty_{ij}$ is the quantity of item j sold with item i is at $price_{ti}$; and $E[qty_i]$ is the expected quantity for item j.

The expected price for item i and the expected quantity for item j may be the average price for item i and the average quantity for item j based on data collected during the time span (t from 1 to N) or recent historical data. Basically, the correlation factor can be representative of how a change in quantity of item j is affected by a price change in item i. Each correlation factor may have a value between −1.0 to +1.0.

Other tests besides correlation can be used to determine significance, including Spearman's rank correlation, measures involving entropy, and so on. However, correlation is recommended because it can be computed quickly and with little memory on large amounts of data. Only the top N positive and negative correlation factors may be selected. A space-efficient algorithm is described below to find the N most significantly related items. This algorithm can run on a computer in a time that scales with $O(I^2*R)$ and memory that scales with $O(I*(3+N))$, where I is the number of items, R is the number of days in the timeseries and N are the number of most positively and negatively correlation factors.

Before beginning to calculate correlations, the mean of each variable is determined in memory. The amount of memory used scales O(I). In one embodiment, a row-by-row scan of the data for each variable is performed. For each variable an accumulator for sumX and a counter for number of rows R encountered up to that point are kept in memory. Each time a new value of X is encountered, that value is: added to sumX, and N is incremented by 1. After the scan is completed, sumX is divided by N to give the mean.

After means have been computed, client computer 12 of the server computer 14 can determine the N items (per dependent item) that are most strongly correlated. For each item X that could have an effect on item Y, a correlation factor is calculated using the memory-efficient method below.

Accumulators for "sum of x times y" (sumXY), "sum of x times x" (sumXX) and "sum of y times y" (sumYY) are used and may reside in memory. Each time a datapoint is encountered, the mean is subtracted, and the accumulators are updated with the result. After completing a scan of all the data (in this case a timeseries that might consist of 600 points or so), the final correlation factor between X and Y, $Corr_{X,Y}$ is calculated by taking sumXY/sqrt (sumXX*sumYY).

If the correlation factor is positive, a variable called "bottom-significant-pos-correlation" can be compared to the correlation factor. If the correlation factor has a value further from zero compared to the bottom-significant-pos-correlation, then item X can be inserted as a correlation factor into the list of "significant-pos-correlations." If there are already N items in the list, the bottom significant variable is deleted, and the method is used to replace bottom-significant-pos-correlation with the next lowest correlation factor within the list. A similar procedure is performed for negative correlation factors.

Figure 4:
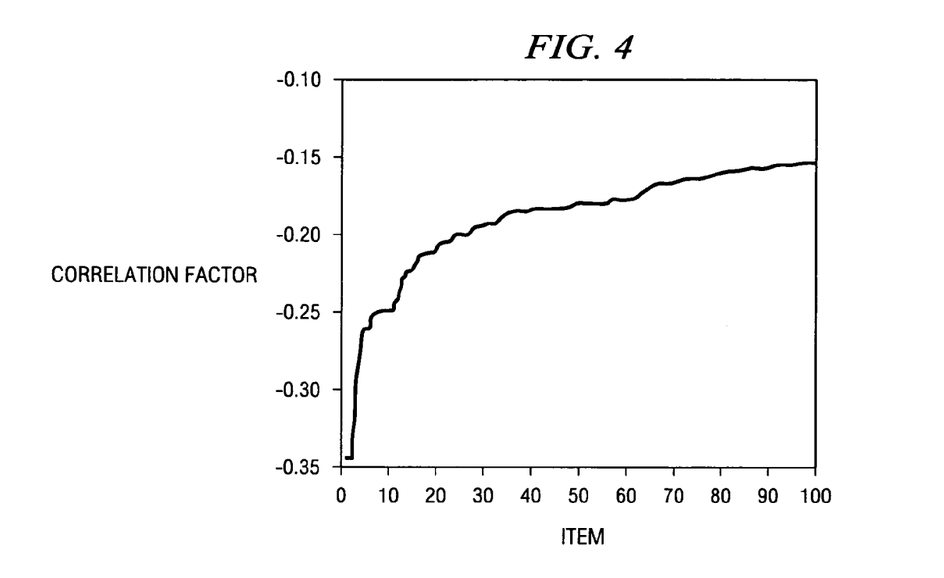
FIGS. 4 and 5 include plots of the 100 top negative correlations and 100 top positive correlations, respectively for a price change in a specific item.
Figure 5:
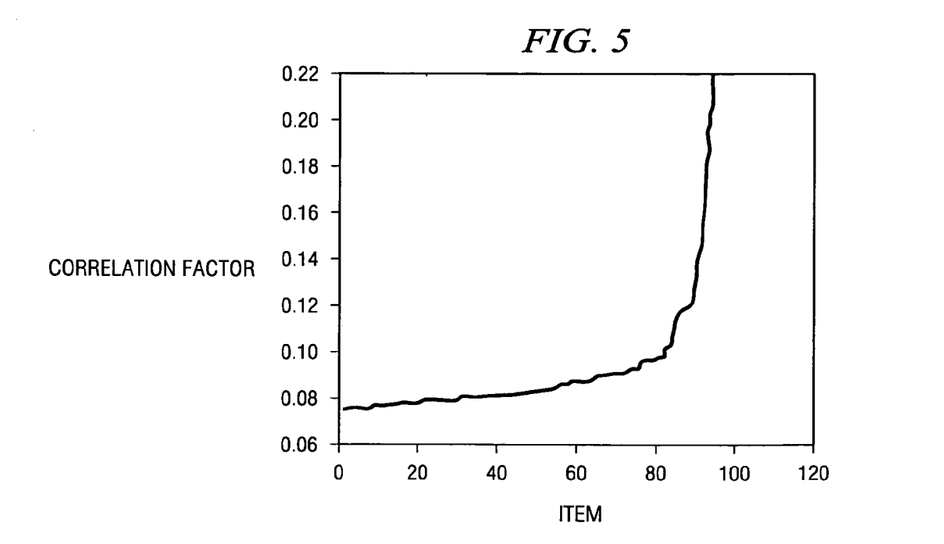

FIGS. 4 and 5 illustrate the top 100 negative and positive correlations, respectively, for a specific target item. As can be seen in these figures, a relatively small number of items have a strong correlation with a price change of the target item (item i). The strength of those correlations drop off rapidly. Thus, although there are over 40,000 items in this example, only a relatively small number of them impact the demand of the target item and should be incorporated into a stepwise variable pool.

FIGS. 4 and 5 show that many items (perhaps 70%) might undergo no price change in an entire year. Thus, the demand changes for these items are not driven by their own price at all, a fact which contradicts most intuitions about selling products! Instead, their demand is most likely being driven by external factors, and particularly the interactions of other products carried by the vendor. For example, customers may see low prices for lettuce and canned soup and then buy many more products at the vendor's store.

In many instances, the price of an item is not one of the most highly correlated drivers affecting its quantity (demand). Many instances may occur in which the correlation factor for the target item was not one in the top one percent of most negatively or most positively correlated items when the price of the target item is changed.

The effects between the same two items may be different. For example, if a first item is a package of hot dog buns and a second item is package of frankfurters, a price change in frankfurters may have a greater effect on the demand for hot dog buns sold, whereas, a price change in hot dog buns may have a lesser effect on demand for frankfurters. Therefore, the effects do not have to be symmetric.

The cross effects may extend beyond one category. Hot dog buns and frankfurters are in different categories. Hot dog buns are a bread-related product, and frankfurters are a meat-related product. Therefore, the method can be used to examine not only the items within a same category but also items within different categories.

Many items may be weakly correlated, and those interactions can be largely ignored. The price of the dishwashing liquid may have a relatively insignificant impact on the demand for a can of soup, and likewise, the price of a can of soup probably may have very little impact on the demand of dishwashing soap. Therefore, the relationship between dishwashing liquid and a can of chicken soup may be significantly smaller as compared to the effects of hot dog buns and frankfurters. Weak correlations are not required are zero-ed out, and do not contribute to the model. The top positive and negative correlations (values farthest from zero) for a price change can be selected.

The number of positive and negative correlations can be chosen by the user. The number can be less than approximately ten percent of all items, and often may be less than approximately one percent. In a store carrying about 40,000 different items, the top 50 positive and top 50 negative correlated items can be used. Using more than this number can increase computation time and frequently does not significantly improve accuracy. In an alternate embodiment, less than 100 correlated items (i.e., top 50 positive and top 50 negative correlated items) may be used.

4. Perform Fast Significance Tests for Correlations Between Other Variables and Quantities of Each Item Sold.

The method further includes determining which "other variables" have a significant effect on demand (quantities) for items carried by a vendor (block 346). These "other variables" may include externalities, lag-demand-terms, and global-price-terms, or the like.

Externalities may include variables for days of the week (Saturday, Sunday, etc.), months of the year, seasons, and the presence of holidays for which the forecast is being generated. For example, the sales of cocoa and hot chocolate may change with the seasons, or the sales of alcohol may change based on the day of the week.

Lag-demand terms are the quantity of an item sold, some days in the past. For instance, the lag-demand of apples with lag=5 is the quantity of apples sold 5 days ago. The lag-demand terms can help capture recurrent patterns in product consumption. For example, newspaper sales tend to be the same each week (note that in this example, externality variables for day-of-week might accomplish the same thing).

Global price terms are aggregated summaries of the prices on different days. For example, an average-price variable for a given day can be used to indicate when the vendor has significantly decreased prices of many items at the vendor's store.

The feature in common with all of the above variables is that they are usually available from the transactional data that a retailer collects in the course of its normal business activities. Because of this, the method can be made to work without any external third party sources of information (which may have complications related to for consumer privacy), or without elaborate records of promotion or newspaper advertising events. Still, such variables could be incorporated if those histories were available. For many retailers, transaction data (such as point-of-sales data) may be the only easily accessible source of information. The method can be used to work with only this source of information; however, the method may be adapted to include other sources of information if they become available.

In attempting to identify which of these factors affect the demand of an item j, the same significance test procedure used for price-terms can be applied to these other variables. The top positive and negatively correlation factors are saved and incorporated into a stepwise regression model that is described later.

At this point, the method has been used to determine the effects of variables on quantities of the items sold within the vendor's store. The method can be used to determine which of the items are more significantly affected by the variable compared to the other items.

5. Generate Weighing Factors for Variables and Incorporate into Model.

After price changes and variables having a significant impact on demand have been identified, the method can be used to generate a matrix of weighing factors for variable-quantity interactions (block 362). A stepwise regression can be performed using only the top positive and negative correlated items (instead of all items) to obtain the more significant weighing factors. A stepwise regression for weakly correlated items does not need to be performed because the weighing factors for those items may be assigned a value of zero.

Weighing factors are determined by stepwise regression and are placed into the matrix of weighting factors for the varible-quantity interactions. All other elements (less significantly affected or weakly correlated) in the matrix may be assigned a value of zero. Typically, no more than approximately ten percent of all elements within the matrix may have a non-zero value, and often, no more than approximately one percent of all elements has a non-zero value.

The method can be used in calculating an operating parameter using the matrix (block 364). The following includes an approximation that can be used with the model.

Q is approximately equal to P×W+E×B+C where,

Q can be a vector representing quantities of items

[Q1, Q2, Q3, . . . Qn];

P can be a vector representing prices of those items

[P1, P2, P3, . . . , Pn];

W can be a square matrix representing weighing factors for price-quantity interactions $$\begin{bmatrix} W1.1, & W1.2, & W1.3, & \ldots, & W1.n \\ W2.1, & W2.2, & W2.3, & \ldots, & W2.n \\ W3.1, & W3.2, & W3.3, & \ldots, & W3.n \\ \vdots & & & & \\ Wn1, & Wn2 & Wn3, & \ldots, & Wnn \end{bmatrix};$$

E can be a vector representing other significant variables including externalities, lag-demand and global-price

[E1, E2, E3, . . . En];

B can be a matrix of the weights representing weighing factors for other significant variable-quantity interactions $$\begin{bmatrix} B1.1, & B1.2, & B1.3, & \ldots, & B1.n \\ B2.1, & B2.2, & B2.3, & \ldots, & B2.n \\ B3.1, & B3.2, & B3.3, & \ldots, & B3.n \\ \vdots & & & & \\ By.1, & By.2 & By.3, & \ldots, & By.n \end{bmatrix};$$

and

C can be a vector representing constants for those items (determined empirically using linear regression)

[C1, C2, C3, . . . , Cn].

Given the above model of demand Q, we can also predict revenue R and profit Z for each item:

R=Q*diag(P)

Z=R−Q*diag(C)

The total quantity, revenue, or profit generated on any given day can be obtained by summing either Q, R, or Z, respectively.

The construction of W can provide insights into the various product interactions inside the store, as will be described later. For the index numbers, first number designates the price of an item and the second number designates the item whose quantity may be affected by the price change in a first item. A diagonal of the matrix going from W1.1 to Wn.n reflects how demand of items are affected by their own prices.

The effects between the same two items may be different. W1.2 can reflect the change in demand for item #2 given a price for item #1. Likewise, W2.1 reflects the change in demand for item #1 given a price for item #2. Note that W1.2 and W2.1 are not necessarily equal and, in most cases, are not equal. For example, if item #1 may be a package of hot dog buns and item 2 may be a package of frankfurters.

The matrix of weights for the other variables-quantity interactions may have rows corresponding to each of these other variable terms and columns corresponding to quantities of items sold corresponding to that variable. Similar to matrix of weights for price-quantity interactions, most of the elements in matrix for the other variable-quantity interactions may be zero except for those items exhibiting the most significant changes (most strongly correlated). The number of elements having a non-zero value within each row of a matrix of weighing factors for the other variable-quantity interactions can be similar to the number of elements having a non-zero value within each row of a matrix of weighing factors for the price-quantity interactions (ten percent, one percent, fifty items, five items, or the like).

Note that the two matrices could be combined into one matrix. The "P×W+E×B" can be replaced by "F×G," where F is a vector and G is a matrix.

The approximation can be varied, if desired. In one embodiment, the approximation can be an equation. In another embodiment, only a single price change on a specific day may be examined. In this instance, the price vector can be replaced by a single price, the weighing factor square matrix can be a row vector, the externalities/lag-demand/global-price (E) can be replaced by a single value, the weights for externality-quantity interactions (B) can be replaced by a row vector, and the constants vector is replaced by a single value. The approximation can be performed relatively quickly because virtually all terms can be first order terms or be zeroed out.

In the approximation, more or fewer terms could be used. For example, some or all terms in E may be omitted, however, accuracy may be affected. If omitting E terms does not significantly affect the approximation, the model can be simplified and take less time to calculate. The calculation for the operating parameter can be used in many different applications, some of which are described below.

6. Applications

A. Demand Forecasting.

Demand forecasting can be performed for individual items, or for overall sales at the store. Demand forecasting can be achieved by inserting the prices and externalities for a particular day, and then calculating the value of Q for that day. A manager of a store may know what items he or she will put on sale a few weeks from now. The method can be used to determine the quantities of items that will need to be acquired before the sale to reduce the likelihood of running out of the items on sale or their complementary items (high positive weighing factors) or having excessive inventories for other items (high negative weighing factors).

B. Price Optimization.

Another implementation may be for price optimization. This involves "solving for P," the price for each item, in order to optimize quantity, revenue, or profit. Because the model "incorporates" the interactions between many products, the model can be used to discover that the price of one item should be dropped because that will increase sales of many items.

A computational advantage of the model for price optimization is that because of the matrix formulation, derivatives for profit with respect to price can be analytically solved. For example, let P, W, E, B and C be as defined previously, and let c equal a vector of margins ("costs") for each item. The vector of first derivatives of revenue with respect to price are:

$$\frac{drev}{dprice_i} = P \cdot W^T + P \cdot W + E \cdot B + c$$

where, T indicates the transpose of the matrix.

Derivatives for profit with respect to price are:

$$\frac{dprofit}{dprice_i} = P \cdot W^T + P \cdot W + E \cdot B + c - W \cdot diag(C)$$

The second derivatives of both revenue and profit with respect to price are:

$$\frac{d^2 profit}{dprice_i^2} = W^T + W$$

Because these derivatives are available, fast gradient descent optimization methods can be employed for maximizing profit. For example, a simple gradient ascent procedure for finding optimum prices is to repeatedly set:

$$P = P + \alpha \left( \frac{dprofit}{dprice} \right)$$

where $1 > \alpha > 0$, until the change in P is less than a certain tolerance. Using the second derivatives, Newton's optimization method will converge on a profit maximum by repeatedly applying the following formula:

$$P = P + \left[ \left( \frac{d^2 profit}{dprice^2} \right)^{-1} \cdot \left( \frac{dprofit}{dprice} \right)^T \right]^T$$

The process is stopped when the change in P is below a certain tolerance. Practitioners in the field of optimization often employ variants of these methods, such as conjugate gradient search, momentum, adaptive parameters, or non-gradient methods may be used.

C. What-If Analysis.

A powerful implementation of the method can be its use for what-if analyses. The user can interactively set prices (alter some of the values in P) and observe the outcome on the store in terms of quantity, revenue, or profit. For instance, the user could see that after increasing some prices, demand (traffic) may drop but profit will increase. The user might then decide that the drop in traffic is unacceptable, and he or she will not implement that price change. Alternatively, the manager of the store may be planning a future promotion. The user can enter those prices and predict what will happen. The model is designed with a general purpose computer in mind because the computer can look at more interactions in a given time frame than reasonably possible by humans. Still, there is no theoretical reason why the method cannot be performed by a human.

D. Inventory Control.

Additionally, capacity planning for the store and inventory management may be possible. The model may be used to predict the sales of products weeks in advance. The manager of the store may order additional inventory in advance. The model may also be used to "spot" future dates at which inventory may run below safety stock levels. An alert can be automatically generated and sent to managers when additional inventory should be ordered for those dates. Similarly, the model may be used to reduce the likelihood of carrying too much inventory, which is inefficient and robs space for other items which need to be kept on-hand.

E. Parasite-Host Analysis

In another application, an analysis of each item i can be performed to determine which products are cannibalizers, which products are parasitic on it, which products are symbiotic with it, and which are suckers. Cannibalizers can be found by looking for positive weighing terms from the price of items j (the cannibalizer) onto item i (the victim). Both products cannibalize if $W_{ij}$ and $W_{ji}$ are both positive. Parasites are items for which a price drop in item j causes a decrease in demand for item i, but for which a price drop in item i does not decrease demand for item j. Symbiotic items are items where both $W_{ij}$ and $W_{ji}$ are negative. Thus, a price drop in item i causes increase in demand for item j and vice versa. This kind of analysis can be useful for manufacturers since they can determine which products are undercutting their sales.

F. Other Applications.

In still another application, the method may be used for specific situations. For example, a store no longer wants to carry a particular item. What is a good way to deplete existing inventories? One way may be to put it on sale, but if the product has a low margin, the sale may result in a loss. The store may find it more efficient to drop the prices of its driver items (high positive weighing factors). Alternatively, the store may raise the prices of other selected items (high negative weighing factors).

Implementation of the methods described herein may significantly improve profitability. For price optimization (to improve profitability), profit margins may increase by approximately five percent. This improvement may be the difference between a store losing money and making a profit.

The embodiments of the present invention can be implemented in software to be used on the client computer 12 or the server computer 14. The grouping or sorting of the data may reduce the likelihood that additional hardware (e.g., more RAM) is needed. Most of the data analysis is related to determining correlations and the weighing factors for the matrices. Using weighing factors speeds calculating, is more efficient, and still gives reasonably good accuracy for results.

The data collected can be all internal to the store. By internal, it is meant that the data is collected through the normal events within the store itself. For example, the sales receipts can be used. Information, such as identities of customers, their ages, any of their demographic information, geographic locations of the store, and the like, are not needed for the calculation. Anonymous transaction data (without customer-identifying codes) can be used.

The method can become more valuable as the number of different items carried by a vendor increases. The vendor may use the method on any portion or all of its operation. For example, the vendor may use the method when modeling one store or a chain of stores. Besides grocery stores, the embodiments can also be used for hardware stores, department stores, specialty stores, or nearly any store.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A computer-implemented method of improving profitability of a store based on knowledge of purchasing interactions between a plurality of items sold within said store over a period of time, comprising:
   in the computer,
   correlating price-quantity interactions between each pair of items of said plurality of items based on transaction data collected from one or more sources;
   determining top positive and negative correlated items based on said price-quantity interactions;
   calculating weighing factors for said top positive and negative correlated items;
   generating a first matrix for said price-quantity interactions by placing into said first matrix said weighing factors for said top positive and negative correlated items and assigning zeros for rest of said plurality of items in said first matrix; and
   determining a demand for quantities for one or more items utilizing said first matrix,
   wherein the step of correlating price-quantity interactions comprises generating correlation factors for said plurality of items,
   wherein each of said correlation factors represents a correlation between a price change of a first item and a change in quantity of a second item, and
   wherein each of said correlation factors $Corr_{i,j}$ is calculated based on $$Corr_{i,j} = \frac{\sum_{t=1}^{N}((price_{ti} - E[price_i]) \cdot (qty_{tj} - E[qty_j]))}{\sqrt{\sum_{t=1}^{N}((price_{ti} - E[price_i])^2 \cdot (qty_{tj} - E[qty_j])^2)}}$$

where said period of time is represented by t from 1 to N; price of an item i at time t is represented by $price_{ti}$; expected price of said item i is represented by $E[price_i]$; quantity of an item j sold with said item i at $price_{ti}$ is represented by $Qty_{tj}$; and
expected quantity of said item j is represented by $E[qty_j]$.

2. The method of claim 1, further comprising:
correlating variable-quantity interactions between one or more variables and quantities of each of said plurality of items sold within said store over said period of time.

3. The method of claim 2, further comprising:
determining which of said variables have a significant effect on said quantities of said plurality of items based on said variable-quantity interactions; and
generating a second matrix for said variable-quantity interactions by placing into said second matrix non-zero weighing factors that are calculated for items that are significantly affected by said variables and assigning zeros for rest of said plurality of items in said second matrix, wherein the step of determining a demand for quantities for one or more items further comprises utilizing said second matrix.

4. A computer-implemented method of improving profitability of a store based on knowledge of purchasing interactions between a plurality of items sold within said store, comprising:
collecting transaction data containing quantities and prices of said plurality of items sold over a period of time;
constructing quantity and price timeseries for each of said plurality of items;
correlating price-quantity interactions between each pair of items of said plurality of items;
determining top positive and negative correlated items based on said price-quantity interactions;
calculating weighing factors for said top positive and negative correlated items;
generating a first matrix for said price-quantity interactions by placing into said first matrix said weighing factors for said top positive and negative correlated items and assigning zeros for rest of said plurality of items in said first matrix; and
determining a demand for quantities for one or more items utilizing said first matrix, wherein the step of correlating price-quantity interactions comprises generating correlation factors utilizing said quantity and price timeseries, wherein each of said correlation factors represents a correlation between a price change of a first item and a chance in quantity of a second item, and wherein each of said correlation factors $Corr_{i,j}$ is calculated based on $$Corr_{i,j} = \frac{\sum_{t=1}^{N}((price_{ti} - E[price_i]) \cdot (qty_{tj} - E[qty_j]))}{\sqrt{\sum_{t=1}^{N}((price_{ti} - E[price_i])^2 \cdot (qty_{ti} - E[qty_j])^2)}}$$

where said period of time is represented by t from 1 to N;
price of an item i at time t is represented by $price_{ti}$;
expected price of said item i is represented by $E[price_i]$;
quantity of an item j sold with said item i at $price_{ti}$ is represented by $Qty_{tj}$; and
expected quantity of said item j is represented by $E[qty_j]$.

5. The method of claim 4, wherein the step of collecting transaction data comprises accessing one or more databases, flat files, or a combination thereof to discover data chronicling transactions within said store.

6. The method of claim 4, wherein the step of collecting transaction data comprises accessing a mining results repository to obtain said transaction data.

7. The method of claim 4, wherein the step of constructing quantity and price timeseries for each of said plurality of items comprises changing a row order of said transaction data so that all records for each of said plurality of items are in contiguous rows.

8. The method of claim 4, wherein the step of constructing quantity and price timeseries for each of said plurality of items comprises setting said price timeseries to equal a mean or median price of an item on a particular day and setting said quantity timeseries to be a sum of quantities of said item sold on said particular day.

9. The method of claim 4, wherein the step of constructing quantity and price timeseries for each of said plurality of items comprises filling said price timeseries with a last observed price on days with no transactions.

10. The method of claim 4, wherein the step of constructing quantity and price timeseries for each of said plurality of items comprises replacing quantities of an item sold everyday with a sum of said item sold that day and within a window of days that follow.

11. The method of claim 4, further comprising:
correlating variable-quantity interactions between one or more variables and quantities of each of said plurality of items sold within said store over said period of time; and
determining which of said variables have a significant effect on said quantities of said plurality of items based on said variable-quantity interactions.

12. The method of claim 11, further comprising:
generating a second matrix for said variable-quantity interactions by placing into said second matrix non-zero weighing factors calculated for items that are significantly affected and assigning zeros for rest of said plurality of items in said second matrix.

13. The method of claim 12, wherein said demand is presented by Q and wherein Q is approximately equal to (P×W+E×B+C) where
P represents a vector containing said prices of said plurality of items,
W represents said first matrix,
E represents a vector containing said variables,
B represents said second matrix, and
C represents a vector containing constants for said plurality of items.

14. The method of claim 13, further comprising predicting a revenue R for each of said one or more items where R=Q*diag(P).

15. The method of claim 14, further comprising predicting a profit Z for each of said one or more items where Z=R−Q*diag(P).

16. The method of claim 12, wherein said demand is presented by Q and wherein Q is approximately equal to (P×W+E×B+C) where
P represents a single price of an item,
W represents a row vector from said first matrix,
E represents a single value of a variable,
B represents a row vector from said second matrix, and
C represents a single value of a constant for said item.

17. A computer-implemented method of improving profitability of a store based on knowledge of purchasing interactions between a plurality of items sold within said store over a period of time, comprising:
performing at least one significance tests on historical transactional data to determine which one or more variables, including price, have a significant effect on quantities for said plurality of items sold within said store over said period of time;
for each variable determined to have a significant effect on quantities for said plurality of items,
calculating weighing factors for said plurality of items with respect to said variable; and
generating a matrix by placing said weighing factors into said matrix for items that are significantly affected by said variable and assigning zeros for all other items; and
determining a demand for quantities for one or more items utilizing at least one or more of said variables and at least one matrix of weighing factors,
where said price is determined to have a significant effect on quantities for said plurality of items, generating correlation factors wherein each of said correlation factors represents a correlation between a price change of a first item and a change in quantity of a second item, and
wherein each of said correlation factors $Corr_{i,j}$ is calculated based on $$Corr_{i,j} = \frac{\sum_{t=1}^{N}((price_{ti} - E[price_i]) \cdot (qty_{tj} - E[qty_j]))}{\sqrt{\sum_{t=1}^{N}((price_{ti} - E[price_i])^2 \cdot (qty_{ti} - E[qty_j])^2)}}$$

where said period of time is represented by t from 1 to N;
price of an item i at time t is represented by $price_{ti}$;
expected price of said item i is represented by $E[price_i]$;
quantity of an item j sold with said item i at $price_{ti}$ is represented by $Qty_{tj}$; and expected quantity of said item j is represented by E[qty$_j$].

18. A computer-readable medium carrying computer-executable instructions implementing a method of improving profitability of a store based on knowledge of purchasing interactions between a plurality of items sold within said store over a period of time, wherein said computer-executable instructions are coded for:
   correlating price-quantity interactions between each pair of items of said plurality of items based on transaction data collected from one or more sources;
   determining top positive and negative correlated items based on said price-quantity interactions;
   calculating weighing factors for said top positive and negative correlated items;
   generating a first matrix for said price-quantity interactions by placing into said first matrix said weighing factors for said top positive and negative correlated items and assigning zeros for rest of said plurality of items in said first matrix; and
   determining a demand for quantities for one or more items utilizing said first matrix,
   wherein the step of correlating price-quantity interactions comprises generating correlation factors,
   wherein each of said correlation factors represents a correlation between a price change of a first item and a change in quantity of a second item, and
   wherein each of said correlation factors Corr$_{i,j}$ is calculated based on $$Corr_{i,j} = \frac{\sum_{t=1}^{N}((price_{ti} - E[price_i]) \cdot (qty_{tj} - E[qty_j]))}{\sqrt{\sum_{t=1}^{N}((price_{ti} - E[price_i])^2 \cdot (qty_{ti} - E[qty_j])^2)}}$$

where said period of time is represented by t from 1 to N; price of an item i at time t is represented by price$_{ti}$; expected price of said item i is represented by E[price$_i$]; quantity of an item j sold with said item i at price$_{ti}$ is represented by Qty$_{tj}$; and
expected quantity of said item j is represented by E[qty$_j$].

19. The computer-readable medium of claim 18, wherein said computer-executable instructions are further coded for:
   correlating variable-quantity interactions between one or more variables and quantities of each of said plurality of items sold within said store over said period of time;
   determining which of said variables have a significant effect on said quantities of said plurality of items based on said variable-quantity interactions; and
   generating a second matrix for said variable-quantity interactions by placing into said second matrix non-zero weighing factors that are calculated for items that are significantly affected by said variables and assigning zeros for rest of said plurality of items in said second matrix, wherein the step of determining a demand for quantities for one or more items further comprises utilizing said second matrix.

20. A computer system programmed to improve profitability of a store based on knowledge of purchasing interactions between a plurality of items sold within said store over a period of time, said computer system comprising:

a computer-readable medium carrying computer-executable instructions for:
   correlating price-quantity interactions between each pair of items of said plurality of items based on transaction data collected from one or more sources;
   determining top positive and negative correlated items based on said price-quantity interactions;
   calculating weighing factors for said top positive and negative correlated items;
   generating a first matrix for said price-quantity interactions by placing into said first matrix said weighing factors for said top positive and negative correlated items and assigning zeros for rest of said plurality of items in said first matrix; and
   determining a demand for quantities for one or more items utilizing said first matrix,
   wherein correlating price-quantity interactions comprises generating correlation factors,
   wherein each of said correlation factors represents a correlation between a price change of a first item and a change in quantity of a second item, and
   wherein each of said correlation factors Corr$_{i,j}$ is calculated based on $$Corr_{i,j} = \frac{\sum_{t=1}^{N}((price_{ti} - E[price_i]) \cdot (qty_{tj} - E[qty_j]))}{\sqrt{\sum_{t=1}^{N}((price_{ti} - E[price_i])^2 \cdot (qty_{ti} - E[qty_j])^2)}}$$

where said period of time is represented by t from 1 to N; price of an item i at time t is represented by price$_{ti}$; expected price of said item i is represented by E[price$_i$]; quantity of an item j sold with said item i at price$_{ti}$ is represented by Qty$_{tj}$; and
expected quantity of said item j is represented by E[qty$_j$]; and
a processor for executing said computer-executable instructions.

21. The computer system of claim 20, wherein said computer-executable instructions are coded for
   correlating variable-quantity interactions between one or more variables and quantities of each of said plurality of items sold within said store over said period of time;
   determining which of said variables have a significant effect on said quantities of said plurality of items based on said variable-quantity interactions; and
   generating a second matrix for said variable-quantity interactions by placing into said second matrix non-zero weighing factors that are calculated for items that are significantly affected by said variables and assigning zeros for rest of said plurality of items in said second matrix, wherein the step of determining a demand for quantities for one or more items further comprises utilizing said second matrix.

22. A computer-readable medium carrying computer-executable instructions implementing a method of improving profitability of a store based on knowledge of purchasing interactions between a plurality of items sold within said store, wherein said computer-executable instructions are coded for:
   collecting transaction data containing quantities and prices of said plurality of items sold over a period of time;

constructing quantity and price timeseries for each of said plurality of items;
correlating price-quantity interactions between each pair of items of said plurality of items;
determining top positive and negative correlated items based on said price-quantity interactions;
calculating weighing factors for said top positive and negative correlated items;
generating a first matrix for said price-quantity interactions by placing into said first matrix said weighing factors for said top positive and negative correlated items and assigning zeros for rest of said plurality of items in said first matrix; and
determining a demand for quantities for one or more items utilizing said first matrix,
wherein the step of correlating price-quantity interactions comprises generating correlation factors utilizing said quantity and price timeseries,
wherein each of said correlation factors represents a correlation between a price change of a first item and a change in quantity of a second item, and
wherein each of said correlation factors $Corr_{i,j}$ is calculated based on $$Corr_{i,j} = \frac{\sum_{t=1}^{N}((price_{ti} - E[price_i]) \cdot (qty_{tj} - E[qty_j]))}{\sqrt{\sum_{t=1}^{N}((price_{ti} - E[price_i])^2 \cdot (qty_{ti} - E[qty_j])^2)}}$$

where said period of time is represented by t from 1 to N;
price of an item i at time t is represented by $price_{ti}$;
expected price of said item i is represented by $E[price_i]$;
quantity of an item j sold with said item i at $price_{ti}$ is represented by $Qty_{tj}$; and
expected quantity of said item j is represented by $E[qty_i]$.

23. The computer-readable medium of claim 22, wherein collecting transaction data comprises accessing one or more databases, flat files, or a combination thereof to discover data chronicling transactions within said store.

24. The computer-readable medium of claim 22, wherein collecting transaction data comprises accessing a mining results repository to obtain said transaction data.

25. The computer-readable medium of claim 22, wherein constructing quantity and price timeseries for each of said plurality of items comprises changing a row order of said transaction data so that all records for each of said plurality of items are in contiguous rows.

26. The computer-readable medium of claim 22, wherein constructing quantity and price timeseries for each of said plurality of items comprises setting said price timeseries to equal a mean or median price of an item on a particular day and setting said quantity timeseries to be a sum of quantities of said item sold on said particular day.

27. The computer-readable medium of claim 22, wherein constructing quantity and price timeseries for each of said plurality of items comprises filling said price timeseries with a last observed price on days with no transactions.

28. The computer-readable medium of claim 22, wherein constructing quantity and price timeseries for each of said plurality of items comprises replacing quantities of an item sold everyday with a sum of said item sold that day and within a window of days that follow.

29. The computer-readable medium of claim 22, wherein said computer-executable instructions are further coded for:
correlating variable-quantity interactions between one or more variables and quantities of each of said plurality of items sold within said store over said period of time; and
determining which of said variables have a significant effect on said quantities of said plurality of items based on said variable-quantity interactions.

30. The computer-readable medium of claim 29, wherein said computer-executable instructions are further coded for generating a second matrix for said variable-quantity interactions by placing into said second matrix non-zero weighing factors calculated for items that are significantly affected and assigning zeros for rest of said plurality of items in said second matrix.

31. The computer-readable medium of claim 30, wherein said demand is presented by Q and wherein Q is approximately equal to (P×W+E×B+C) where
P represents a vector containing said prices of said plurality of items,
W represents said first matrix,
E represents a vector containing said variables,
B represents said second matrix, and
C represents a vector containing constants for said plurality of items.

32. The computer-readable medium of claim 31, wherein said computer-executable instructions are further coded for predicting a revenue R for each of said one or more items where R=Q*diag(P).

33. The computer-readable medium of claim 32, wherein said computer-executable instructions are further coded for predicting a profit Z for each of said one or more items where Z=R−Q*diag(P).

34. The computer-readable medium of claim 30, wherein said demand is presented by Q and wherein Q is approximately equal to (P×W+E×B+C) where
P represents a single price of an item,
W represents a row vector from said first matrix,
E represents a single value of a variable,
B represents a row vector from said second matrix, and
C represents a single value of a constant for said item.

35. A computer system programmed to improve profitability of a store based on knowledge of purchasing interactions between a plurality of items sold within said store, said computer system comprising:
a computer-readable medium carrying computer-executable instructions for:
collecting transaction data containing quantities and prices of said plurality of items sold over a period of time;
constructing quantity and price timeseries for each of said plurality of items;
correlating price-quantity interactions between each pair of items of said plurality of items;
determining top positive and negative correlated items based on said price-quantity interactions;
calculating weighing factors for said top positive and negative correlated items;
generating a first matrix for said price-quantity interactions by placing into said first matrix said weighing factors for said top positive and negative correlated items and assigning zeros for rest of said plurality of items in said first matrix; and
determining a demand for quantities for one or more items utilizing said first matrix, wherein the step of correlating price-quantity interactions comprises generating correlation factors utilizing said quantity and price timeseries, wherein each of said correlation factors represents a correlation between a price change of a first item and a change in quantity of a second item, and wherein each of said correlation factors $Corr_{i,j}$ is calculated based on $$Corr_{i,j} = \frac{\sum_{t=1}^{N}((price_{ti} - E[price_i]) \cdot (qty_{tj} - E[qty_j]))}{\sqrt{\sum_{t=1}^{N}((price_{ti} - E[price_i])^2 \cdot (qty_{ti} - E[qty_j])^2)}}$$

where said period of time is represented by t from 1 to N;
price of an item i at time t is represented by $price_{ti}$;
expected price of said item i is represented by $E[price_i]$;
quantity of an item j sold with said item i at $price_{ti}$ is represented by $Qty_{tj}$; and
expected quantity of said item j is represented by $E[qty_i]$; and a processor for executing said computer-executable instructions.

36. The computer system of claim 35, wherein collecting transaction data comprises accessing one or more databases, flat files, or a combination thereof to discover data chronicling transactions within said store.

37. The computer system of claim 35, wherein collecting transaction data comprises accessing a mining results repository to obtain said transaction data.

38. The computer system of claim 35, wherein constructing quantity and price timeseries for each of said plurality of items comprises changing a row order of said transaction data so that all records for each of said plurality of items are in contiguous rows.

39. The computer system of claim 35, wherein constructing quantity and price timeseries for each of said plurality of items comprises setting said price timeseries to equal a mean or median price of an item on a particular day and setting said quantity timeseries to be a sum of quantities of said item sold on said particular day.

40. The computer system of claim 35, wherein constructing quantity and price timeseries for each of said plurality of items comprises filling said price timeseries with a last observed price on days with no transactions.

41. The computer system of claim 35, wherein constructing quantity and price timeseries for each of said plurality of items comprises replacing quantities of an item sold everyday with a sum of said item sold that day and within a window of days that follow.

42. The computer system of claim 35, wherein said computer-executable instructions are coded for:
correlating variable-quantity interactions between one or more variables and quantities of each of said plurality of items sold within said store over said period of time; and
determining which of said variables have a significant effect on said quantities of said plurality of items based on said variable-quantity interactions.

43. The computer system of claim 35, wherein said computer-executable instructions are coded for generating a second matrix for said variable-quantity interactions by placing into said second matrix non-zero weighing factors calculated for items that are significantly affected and assigning zeros for rest of said plurality of items in said second matrix.

44. The computer system of claim 43, wherein said demand is presented by Q and wherein Q is approximately equal to (P×W+E×B+C) where
P represents a vector containing said prices of said plurality of items,
W represents said first matrix,
E represents a vector containing said variables,
B represents said second matrix, and
C represents a vector containing constants for said plurality of items.

45. The computer system of claim 44, wherein said computer-executable instructions are further coded for predicting a revenue R for each of said one or more items where R=Q*diag(P).

46. The computer system of claim 45, wherein said computer-executable instructions are further coded for predicting a profit Z for each of said one or more items where Z=R−Q*diag(P).

47. The computer system of claim 43, wherein said demand is presented by Q and wherein Q is approximately equal to (P×W+E×B+C) where
P represents a single price of an item,
W represents a row vector from said first matrix,
E represents a single value of a variable,
B represents a row vector from said second matrix, and
C represents a single value of a constant for said item.

48. A computer-readable medium carrying computer-executable instructions implementing a method of improving profitability of a store based on knowledge of purchasing interactions between a plurality of items sold within said store over a period of time, wherein said computer-executable instructions are coded for:
performing at least one significance tests on historical transactional data to determine which one or more variables, including price, have a significant effect on quantities for said plurality of items sold within said store over said period of time;
for each variable determined to have a significant effect on quantities for said plurality of items,
calculating weighing factors for said plurality of items with respect to said variable; and
generating a matrix by placing said weighing factors into said matrix for items that are significantly affected by said variable and assigning zeros for all other items; and
determining a demand for quantities for one or more items utilizing at least one or more of said variables and at least one matrix of weighing factors,
where said price is determined to have a significant effect on quantities for said plurality of items, generating correlation factors wherein each of said correlation factors represents a correlation between a price change of a first item and a change in quantity of a second item, and
wherein each of said correlation factors $Corr_{i,j}$ is calculated based on $$Corr_{i,j} = \frac{\sum_{t=1}^{N} ((price_{ti} - E[price_i]) \cdot (qty_{tj} - E[qty_j]))}{\sqrt{\sum_{t=1}^{N} ((price_{ti} - E[price_i])^2 \cdot (qty_{ti} - E[qty_j])^2)}}$$

where said period of time is represented by t from 1 to N; price of an item i at time t is represented by $price_{ti}$; expected price of said item i is represented by $E[price_i]$; quantity of an item j sold with said item i at $price_{ti}$ is represented by $Qty_{tj}$; and expected quantity of said item j is represented by $E[qty_i]$.

49. A computer system programmed to improve profitability of a store based on knowledge of purchasing interactions between a plurality of items sold within said store over a period of time, said computer system comprising:
a computer-readable medium carrying computer-executable instructions for:
performing at least one significance tests on historical transactional data to determine which one or more variables, including price, have a significant effect on quantities for said plurality of items sold within said store over said period of time;
for each variable determined to have a significant effect on quantities for said plurality of items,
calculating weighing factors for said plurality of items with respect to said variable; and
generating a matrix by placing said weighing factors into said matrix for items that are significantly affected by said variable and assigning zeros for all other items; and determining a demand for quantities for one or more items utilizing at least one or more of said variables and at least one matrix of weighing factors, where said price is determined to have a significant effect on quantities for said plurality of items, generating correlation factors wherein each of said correlation factors represents a correlation between a price change of a first item and a change in quantity of a second item, and wherein each of said correlation factors $Corr_{i,j}$ is calculated based on $$Corr_{i,j} = \frac{\sum_{t=1}^{N} ((price_{ti} - E[price_i]) \cdot (qty_{tj} - E[qty_j]))}{\sqrt{\sum_{t=1}^{N} ((price_{ti} - E[price_i])^2 \cdot (qty_{tj} - E[qty_j])^2)}}$$

where said period of time is represented by t from 1 to N;
price of an item i at time t is represented by $price_{ti}$;
expected price of said item i is represented by $E[price_i]$;
quantity of an item j sold with said item i at $price_{ti}$ is represented by $Qty_{tj}$; and
expected quantity of said item j is represented by $E[qty_i]$; and
a processor for executing said computer-executable instructions.

* * * * *